United States Patent
Teater et al.

(10) Patent No.: US 9,424,136 B1
(45) Date of Patent: Aug. 23, 2016

(54) SYSTEMS AND METHODS FOR CREATING OPTIMIZED SYNTHETIC BACKUP IMAGES

(71) Applicant: Symantec Corporation, Mountain View, CA (US)

(72) Inventors: David Teater, Minneapolis, MN (US); Matthew Kokotovich, Saint Paul, MN (US); Timothy Naftel, Longmont, CO (US); Weibao Wu, Vadnais Heights, MN (US); Satyajit Gorhe Parlikar, Shoreview, MN (US)

(73) Assignee: Veritas Technologies LLC, Mountain View, CA (US)

( * ) Notice: Subject to any disclaimer, the term of this patent is extended or adjusted under 35 U.S.C. 154(b) by 170 days.

(21) Appl. No.: 13/915,682

(22) Filed: Jun. 12, 2013

(51) Int. Cl.
*G06F 11/14* (2006.01)
*G06F 3/06* (2006.01)

(52) U.S. Cl.
CPC ............ *G06F 11/1451* (2013.01); *G06F 3/065* (2013.01); *G06F 11/1458* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,437,523 | B1 * | 10/2008 | Ting et al. | 711/161 |
| 7,634,627 | B1 * | 12/2009 | Ohr et al. | 711/162 |
| 7,921,328 | B1 * | 4/2011 | Gulati et al. | 714/6.23 |
| 8,595,188 | B2 * | 11/2013 | Gruhl et al. | 707/646 |
| 8,751,515 | B1 * | 6/2014 | Xing et al. | 707/755 |
| 2007/0239958 | A1 * | 10/2007 | Yamamoto et al. | 711/202 |
| 2008/0307018 | A1 * | 12/2008 | Ulrich et al. | 707/204 |
| 2009/0182789 | A1 * | 7/2009 | Sandorfi et al. | 707/204 |
| 2009/0307286 | A1 * | 12/2009 | Laffin | 707/204 |
| 2014/0006853 | A1 * | 1/2014 | Dudgeon et al. | 714/15 |

OTHER PUBLICATIONS

Dell Inc.; Quest Software Launches vRanger Update to Enhance VMware Backup, Replication and Recovery; http://www.quest.com/news-release/quest-software-launches-vranger-update-to-enhance-vmware-backup-repli-072011-814958.aspx; Jul. 25, 2011; Aliso Viejo, CA; As accessed on Apr. 3, 2013.

(Continued)

*Primary Examiner* — Jared Rutz
*Assistant Examiner* — Charles Choi
(74) *Attorney, Agent, or Firm* — ALG INTELLECTUAL PROPERTY, LLC

(57) ABSTRACT

A computer-implemented method for creating optimized synthetic backup images may include (1) transferring a backup image that represents a virtual machine at a specific point in time to a server that stores the backup image, (2) identifying a subsequent backup image that represents at least a portion of the virtual machine at a subsequent point in time, (3) creating a data stream that includes (i) at least one changed data block captured in the subsequent backup image and (ii) at least one reference that identifies where at least one unchanged data block is located within the backup image stored on the server, and then (4) transferring the data stream to the server to enable the server to create an optimized synthetic backup image of the virtual machine. Various other methods, systems, and computer-readable media are also disclosed.

17 Claims, 8 Drawing Sheets

(56) References Cited

OTHER PUBLICATIONS

Veeam Help Center; Reversed Incremental Backup; Veeam Backup & Replication 6.5 for VMware; http://www.veeam.com/vmware-backup/help-center/vsphere/index.html?reversed_incremental_backup.html; Apr. 17, 2013; As accessed on Apr. 3, 2013.

Commvault; Administration Guide—Virtual Server iDataAgent (VMware); http://documentation.commvault.com/hds/release_9_0_0/books_online_1/english_us/pdf/vs_vmware_admin.pdf; As accessed on Apr. 3, 2013.

* cited by examiner

SYSTEMS AND METHODS FOR CREATING OPTIMIZED SYNTHETIC BACKUP IMAGES

BACKGROUND

In today's world of vast computing technology, many technology users are concerned with protecting the integrity and reliability of their virtual machines. In an effort to address this concern, some users may utilize a backup and restore technology to back up their virtual machines. For example, a conventional backup and restore technology may capture a full backup image of a virtual machine. In this example, the conventional backup and restore technology may later capture an incremental backup image that includes only those data blocks that have changed within the virtual machine since the full backup image. The conventional backup and restore technology may then be able to use the incremental backup image in conjunction with the full backup image to create a synthetic backup image that includes all of the data blocks located within the virtual machine at the later point in time.

Unfortunately, while conventional backup and restore technologies may be able to use an incremental backup image in conjunction with a full backup image to create a synthetic backup image, such backup and restore technologies may suffer from one or more shortcomings and/or inefficiencies. For example, a conventional backup and restore technology may be unable to create a synthetic backup image that includes only the data currently used by the virtual machine. In another example, the conventional backup and restore technology may need to mount and index one or more virtual disks of the synthetic backup image in order to complete the synthesis process.

As such, the instant disclosure identifies a need for additional and improved systems and methods for creating optimized synthetic backup images.

SUMMARY

As will be described in greater detail below, the instant disclosure generally relates to systems and methods for creating optimized synthetic backup images based at least in part on a data stream that includes at least one changed data block and at least one reference that identifies where at least one unchanged data block is located within a previous backup image.

In one example, a computer-implemented method for creating optimized synthetic backup images may include (1) transferring a backup image that represents a virtual machine at a specific point in time to a server that stores the backup image, (2) identifying a subsequent backup image that represents at least a portion of the virtual machine at a subsequent point in time, (3) creating a data stream that includes (i) at least one data block captured in the subsequent backup image that changed within the virtual machine between the specific point in time and the subsequent point in time and (ii) at least one reference that identifies where at least one data block that remained unchanged within the virtual machine between the specific point in time and the subsequent point in time is located within the backup image stored on the server, and then (4) transferring the data stream to the server to enable the server to (i) create a synthetic backup image that represents the virtual machine at the subsequent point in time based at least in part on the changed data block included in the data stream and the unchanged data block whose location within the backup image is identified by the reference and (ii) optimize the synthetic backup image by excluding at least one data block captured in the backup image that was deleted from the virtual machine between the specific point in time and the subsequent point in time.

In some examples, the method may also include identifying a plurality of data blocks included in the backup image of the virtual machine. In such examples, the method may further include creating a file that identifies where the plurality of data blocks are located within the backup image of the virtual machine.

In some examples, the method may also include determining where the unchanged data block is located within the backup image based at least in part on the file. In such examples, the method may further include searching the file for the location of the unchanged data block within the backup image of the virtual machine. Additionally or alternatively, the method may include identifying the location of the unchanged data block within the backup image of the virtual machine while searching the file.

In some examples, the method may also include mapping a plurality of volumes within the backup image of the virtual machine. In such examples, the method may further include identifying a location of each of the plurality of data blocks within the backup image of the virtual machine while mapping the plurality of volumes.

In some examples, the method may also include obtaining a list of changed data blocks from virtualization software that facilitates execution of the virtual machine. In such examples, the method may further include determining that the data block has changed within the virtual machine based at least in part on the list of changed data blocks obtained from the virtualization software.

In some examples, the method may also include storing the optimized synthetic backup image to facilitate restoring the virtual machine to a computing state experienced by the virtual machine at the subsequent point in time. In such examples, the method may further include restoring the virtual machine without the data block deleted from the virtual machine between the specific point in time and the subsequent point in time.

In some examples, the method may also include capturing the backup image of the virtual machine on a host computing system at the specific point in time. Additionally or alternatively, the method may include obtaining the backup image from the host computing system.

In some examples, the method may also include capturing the backup image of the virtual machine on the host computing system at the subsequent point in time. Additionally or alternatively, the method may include obtaining the backup image from the host computing system.

In some examples, the backup image may include a full backup of the virtual machine. In such examples, the subsequent backup image may include an incremental backup of the virtual machine. Additionally or alternatively, the reference that identifies where the unchanged data block is located within the backup image may include a placeholder for the unchanged data block.

In one embodiment, a system for implementing the above-described method may include (1) a transfer module that transfers a backup image that represents a virtual machine at a specific point in time to a server that stores the backup image, (2) an identification module that identifies a subsequent backup image that represents at least a portion of the virtual machine at a subsequent point in time, (3) a creation module that creates a data stream including (i) at least one data block captured in the subsequent backup image that changed within the virtual machine between the specific point in time and the subsequent point in time and (ii) at least one reference that identifies where at least one data block that remained unchanged within the virtual machine between the specific point in time and the subsequent point in time is located within the backup image stored on the server. The transfer module may further transfer the data stream to the server to enable the server to (1) create a synthetic backup image that represents the virtual machine at the subsequent point in time based at least in part on the changed data block included in the data stream and the unchanged data block whose location within the backup image is identified by the reference and (2) optimize the synthetic backup image by excluding at least one data block captured in the backup image that was deleted from the virtual machine between the specific point in time and the subsequent point in time. The system may also include at least one processor configured to execute the identification module, the transfer module, and the creation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) transfer a backup image that represents a virtual machine at a specific point in time to a server that stores the backup image, (2) identify a subsequent backup image that represents at least a portion of the virtual machine at a subsequent point in time, (3) create a data stream that includes (i) at least one data block captured in the subsequent backup image that changed within the virtual machine between the specific point in time and the subsequent point in time and (ii) at least one reference that identifies where at least one data block that remained unchanged within the virtual machine between the specific point in time and the subsequent point in time is located within the backup image stored on the server, and then (4) transfer the data stream to the server to enable the server to (i) create a synthetic backup image that represents the virtual machine at the subsequent point in time based at least in part on the changed data block included in the data stream and the unchanged data block whose location within the backup image is identified by the reference and (ii) optimize the synthetic backup image by excluding at least one data block captured in the backup image that was deleted from the virtual machine between the specific point in time and the subsequent point in time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
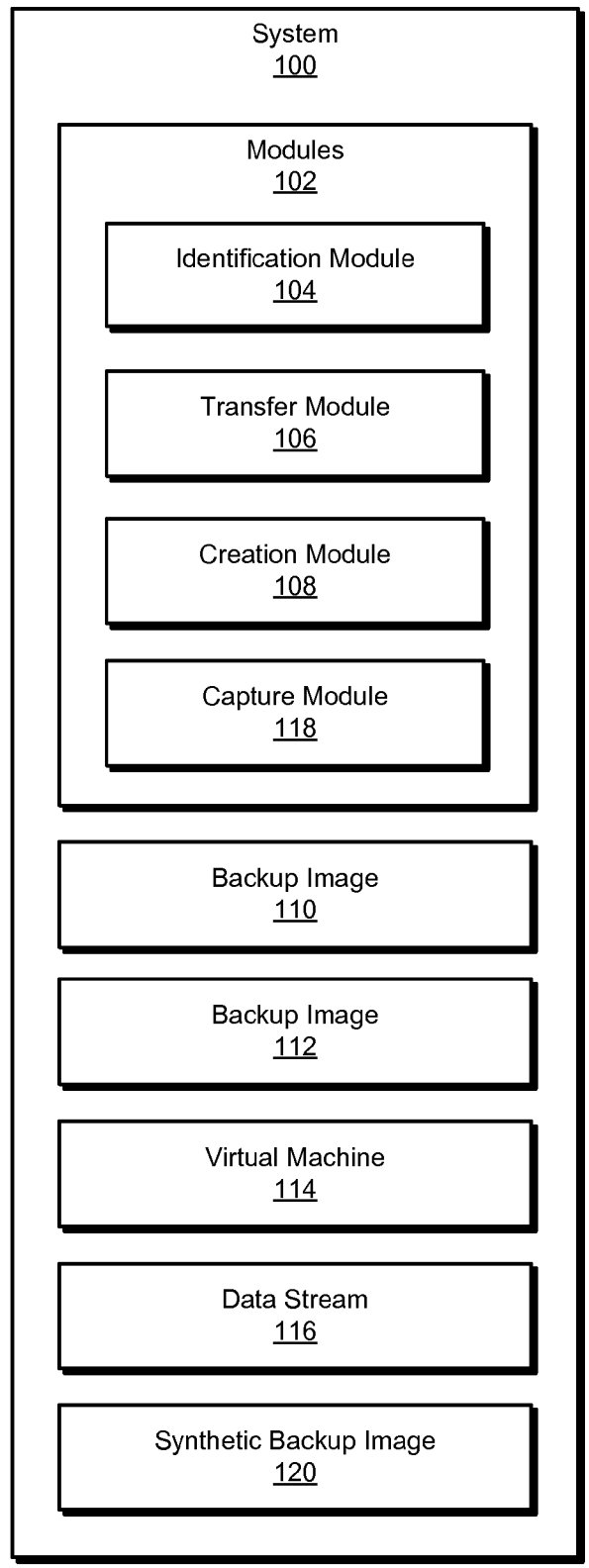
FIG. 1 is a block diagram of an exemplary system for creating optimized synthetic backup images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating optimized synthetic backup images. As will be explained in greater detail below, by creating a state file that identifies where specific data blocks are located within the full backup image of a virtual machine and then transferring the full backup image to a media server for long-term storage and/or maintenance, the various systems and methods described herein may reference this state file to create a data stream that facilitates synthesizing and optimizing a subsequent backup image of the virtual machine on the media server.

For example, by referencing this state file, the various systems and methods described herein may be able to create a data stream that includes (1) at least one data block that has changed within the virtual machine and (2) at least one reference that identifies where at least one data block that has remained unchanged within the virtual machine is located within the full backup image stored on the media server. By creating this data stream and then transferring the same to the media server, the various systems and methods described herein may enable the media server to synthesize and optimize a true accelerated backup image of the virtual machine that excludes data blocks previously deleted from the virtual machine without mounting any virtual disks of the synthetic backup image to complete the synthesis process.

Figure 2:
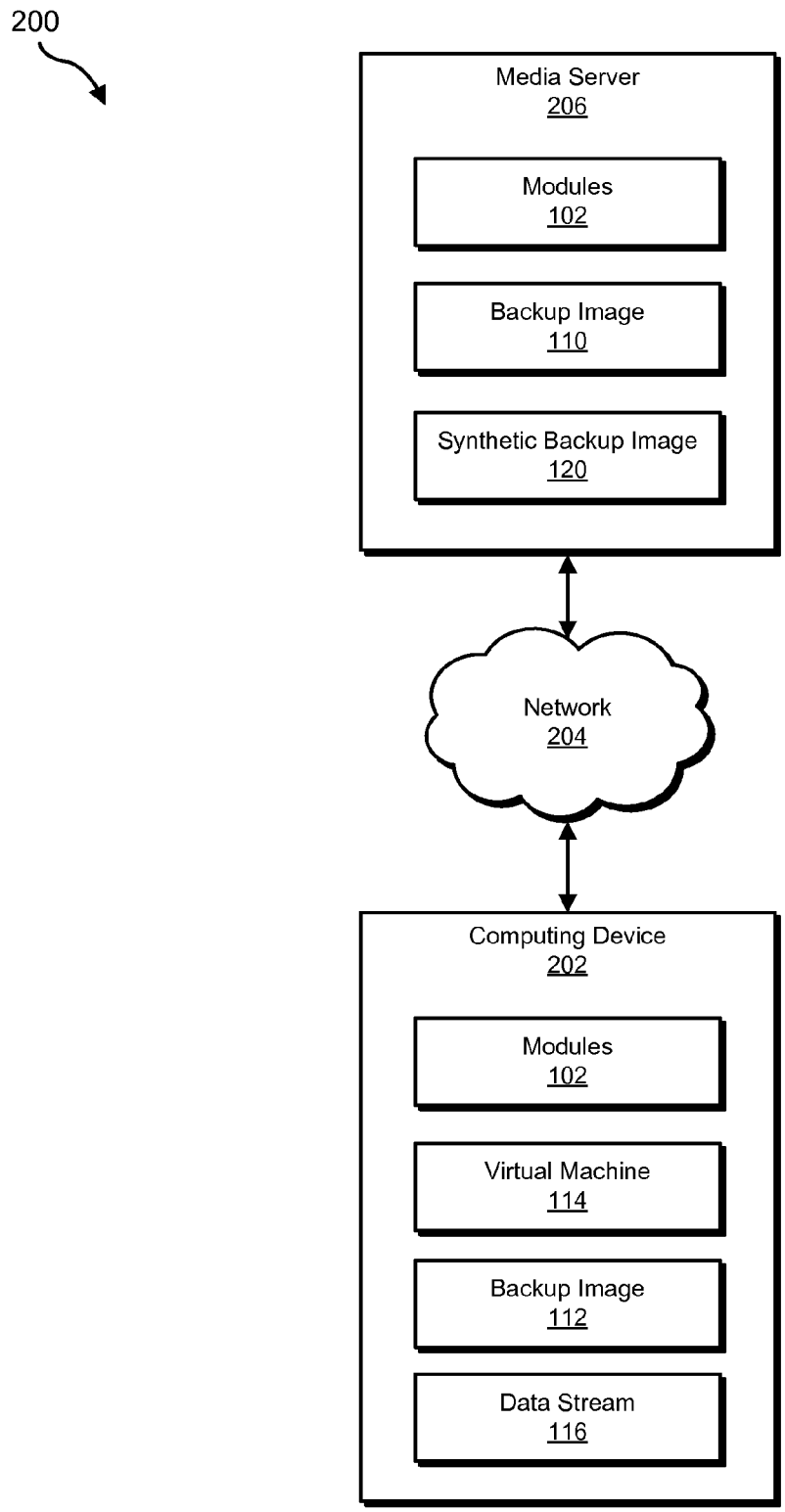
FIG. 2 is a block diagram of an exemplary system for creating optimized synthetic backup images.
Figure 3:
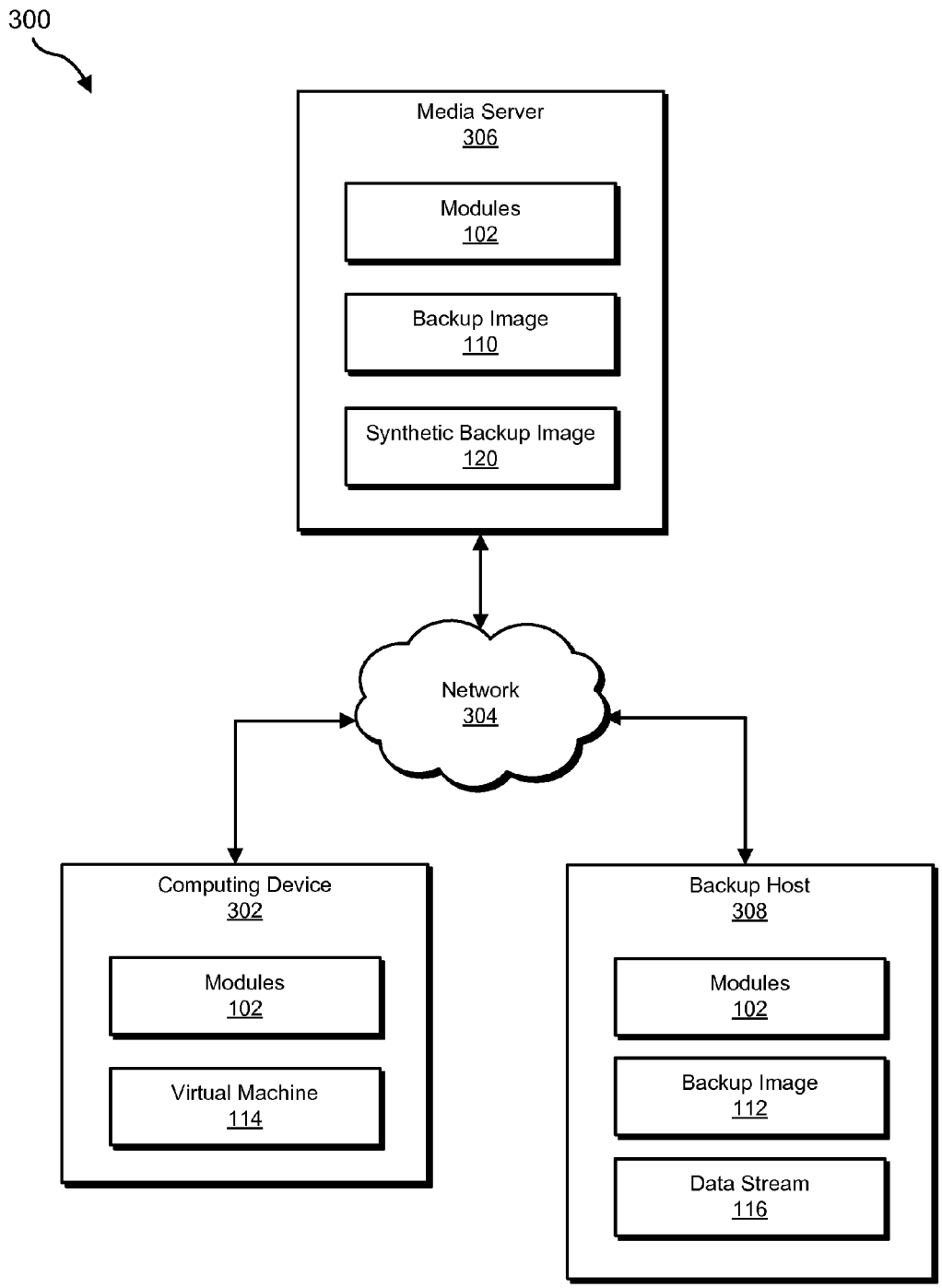
FIG. 3 is a block diagram of an exemplary system for creating optimized synthetic backup images.

The following will provide, with reference to FIGS. 1-3, detailed descriptions of exemplary systems for creating optimized synthetic backup images. Detailed descriptions of corresponding computer-implemented methods will be provided in connection with FIG. 4. Detailed descriptions of an exemplary state file and data stream will be provided in connection with FIGS. 5 and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for creating optimized synthetic backup images. As illustrated in this figure, exemplary system 100 may include one or more modules 102 for performing one or more tasks. For example, and as will be explained in greater detail below, exemplary system 100 may include an identification module 104 that identifies (1) a backup image of the virtual machine that represents a virtual machine at a specific point in time, (2) a subsequent backup image that represents at least a portion of the virtual machine at a subsequent point in time, (3) at least one data block captured in the subsequent backup image that changed within the virtual machine between the specific point in time and the subsequent point in time, and/or (4) at least one data block that remained unchanged within the virtual machine between the specific point in time and the subsequent point in time.

In addition, and as will be described in greater detail below, exemplary system 100 may also include a creation module 108 that creates a data stream that includes (i) the changed data block captured in the subsequent backup image and (ii) at least one reference that identifies where the unchanged data block is located within the backup image. Exemplary system 100 may also include a transfer module 106 that transfers (1) the backup image of the virtual machine to a server and/or (2) the data stream to the server to enable the server to (i) create a synthetic backup image that represents the virtual machine at the subsequent point in time based at least in part on the changed data block included in the data stream and the unchanged data block whose location within the backup image is identified by the reference and/or (ii) optimize the synthetic backup image by excluding at least one data block captured in the backup image that was deleted from the virtual machine between the specific point in time and the subsequent point in time.

In some embodiments, exemplary system 100 may further include a capture module 118 that captures (1) the backup image of the virtual machine at the specific point in time and/or (2) the subsequent backup image of the virtual machine at the subsequent point in time. Although illustrated as separate elements, one or more of modules 102 in FIG. 1 may represent portions of a single module or application (such as SYMANTEC NETBACKUP, SYMANTEC BACKUP EXEC, SYMANTEC SYSTEM RECOVERY, VMWARE CONSOLIDATED BACKUP, VEEAM BACKUP AND REPLICATION, IBM TRIVOLI STORAGE MANAGER, QUEST VRANGER, or ACRONIS BACKUP & RECOVERY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 3 (e.g., computing device 202 and/or media server 206), the devices illustrated in FIG. 3 (e.g., computing device 302, media server 306, and/or backup host 308), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 may also include one or more databases (not illustrated in FIG. 1) located on one or more computing devices. In one example, a database may be configured to store any data and/or information used to create optimized synthetic backup images of a virtual machine (such as virtual machine 114 in FIG. 1). The phrase "virtual machine," as used herein, generally refers to any operating system environment that is abstracted from computing hardware by a virtual machine manager (e.g., a hypervisor).

In one example, the database may store one or more of backup images (such as backup images 110 and 112 and/or synthetic backup image 120 in FIG. 1) that represent the virtual machine at specific points in time. The phrase "backup image," as used herein, generally refers to any type or form of file that includes a complete or partial copy of the contents and/or data located on a computing or storage device at a particular point in time. Examples of such backup images include, without limitation, full backup images, incremental backup images, differential backup images, accelerated backup images, deduplicated backup images, synthetic backup images, snapshots, combinations of one or more of the same, or any other suitable backup images.

Additionally or alternatively, the database may store at least one data stream (such as data stream 116 in FIG. 1) that facilitates synthesizing and/or optimizing at least one of the backup images. The phrase "data stream," as used herein, generally refers to any type or form of bit sequence that is streamed to a computing device (such as media server 206 in FIG. 2 or media server 306 in FIG. 3) over a period of time. Examples of such a data stream include, without limitation, bitstreams, bytestreams, Tape Archive (TAR) streams, TAR headers, codatas, combinations of one or more of the same, or any other suitable data streams.

Additionally or alternatively, the database may store at least one synthetic backup image (such as synthetic backup image 120 in FIG. 1). The phrase "synthetic backup image," as used herein, generally refers to any type or form of backup image that represents the computing state of a virtual machine at a specific point in time and is synthesized based at least in part on a data stream and/or a previously captured backup image.

The database may represent portions of a single database or computing device or a plurality of databases or computing devices. For example, the database may represent one or more portions of computing device 202 and/or media server 206 in FIG. 2, computing device 302, media server 306, and/or backup host 308 in FIG. 3, computing system 710 in FIG. 7, and/or portions of exemplary network architecture 800 in FIG. 8. Alternatively, the database may represent one or more physically separate devices capable of being accessed by a computing device, such as computing device 202 and/or media server 206 in FIG. 2, computing device 302, media server 306, and/or backup host 308 in FIG. 3, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a media server 206 via a network 204. Computing device 202 may be programmed with one or more of modules 102 and/or virtual machine 114. Computing device 202 may also include backup image 112 and/or data stream 116.

Additionally or alternatively, server 206 may be programmed with one or more of modules 102. Media server 206 may also include backup image 110 and/or synthetic backup image 120.

In another example, all or a portion of exemplary system 100 may represent portions of exemplary system 300 in FIG. 3. As shown in FIG. 3, system 300 may include a computing device 302 in communication with a backup host 308 and/or a media server 306 via a network 304. Computing device 302 may be programmed with one or more of modules 102 and/or virtual machine 114.

Additionally or alternatively, media server 306 may be programmed with one or more of modules 102. Media server 306 may also include backup image 110 and/or synthetic backup image 120.

Additionally or alternatively, backup host 308 may be programmed with one or more of modules 102. Backup host 308 may also include backup image 112 and/or data stream 116.

In one embodiment, one or more of modules 102 from FIG. 1 may, when executed by at least one processor of at least one of the devices illustrated in FIG. 2 or 3, facilitate the device in creating optimized synthetic backup images. For example, and as will be described in greater detail below, one or more of modules 102 may cause computing device 202 in FIG. 2 or backup host 308 in FIG. 3 to (1) identify backup image 110 that represents virtual machine 114 at a specific point in time, (2) transfer backup image 110 of virtual machine 114 to a media server (e.g., media server 206 in FIG. 2 or media server 306 in FIG. 3), (3) identify backup image 112 that represents at least a portion of virtual machine 114 at a subsequent point in time, (4) identify at least one data block captured in backup image 112 that changed within virtual machine 114 between the specific point in time and the subsequent point in time, (5) identify at least one data block that remained unchanged within virtual machine 114 between the specific point in time and the subsequent point in time, (6) create data stream 116 that includes (i) the changed data block captured in backup image 112 and (ii) at least one reference that identifies where the unchanged data block is located within backup image 110, and then (7) transfer data stream 116 to the media server to enable the media server to (i) create synthetic backup image 120 that represents virtual machine 114 at the subsequent point in time based at least in part on the changed data block included in data stream 116 and the unchanged data block whose location within backup image 110 is identified by the reference and (ii) optimize synthetic backup image 120 by excluding at least one data block captured in backup image 110 that was deleted from virtual machine 114 between the specific point in time and the subsequent point in time.

Computing devices 202 and 302 generally represent any type or form of computing device capable of reading computer-executable instructions. Examples of computing devices 202 and 302 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Media servers 206 and 306 generally represent any type or form of computing device capable of storing, maintaining, providing, and/or synthesizing backup images of a virtual machine. Examples of media servers 206 and 306 include, without limitation, application servers, web servers, storage servers, deduplication servers, and/or database servers configured to run certain software applications and/or provide various web, storage, and/or database services.

Backup host 308 generally represents any type or form of computing device capable of creating data streams that facilitate synthesizing and/or optimizing backup images on media servers. Examples of backup host 308 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable backup host 308.

Networks 204 and 304 generally represents any medium or architecture capable of facilitating communication or data transfer. Examples of networks 204 and 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Networks 204 and 304 may facilitate communication or data transfer using wireless or wired connections.

Figure 4:
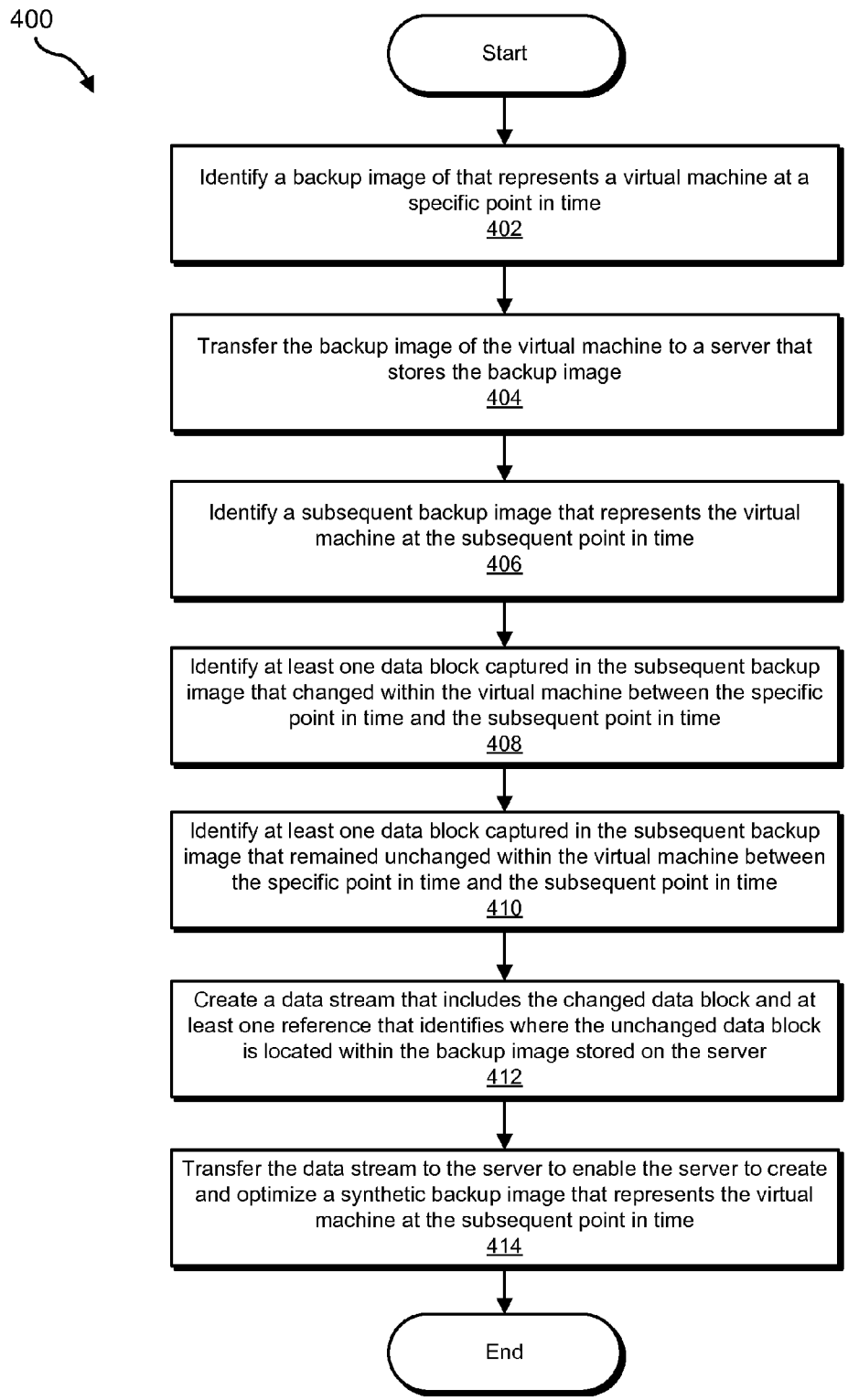
FIG. 4 is a flow diagram of an exemplary method for creating optimized synthetic backup images.

FIG. 4 is a flow diagram of an exemplary computer-implemented method 400 for creating optimized synthetic backup images. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 710 in FIG. 7, and/or portions of exemplary network architecture 800 in FIG. 8.

As illustrated in FIG. 4, at step 402 one or more of the systems described herein may identify a backup image that represents a virtual machine at a specific point in time. For example, at step 402 identification module 104 may, as part of computing device 202 in FIG. 2 or backup host 308 in FIG. 3, identify backup image 110 that represents virtual machine 114 at a specific point in time. In one example, backup image 110 may include a full backup image of virtual machine 114. In another example, backup image 110 may include an incremental backup image of virtual machine 114 used to synthesize a full backup image.

The systems described herein may perform step 402 in a variety of ways. In some examples, identification module 104 may identify backup image 110 of virtual machine 114 as backup image 110 is captured. For example, capture module 118 may, as part of computing device 202 in FIG. 2, capture backup image 110 of virtual machine 114 on computing device 202 at the specific point in time. In this example, as capture module 118 captures backup image 110 of virtual machine 114, identification module 104 may identify backup image 110.

Upon identifying backup image 110, identification module 104 may identify a plurality of data blocks included in backup image 110. For example, identification module 104 may map a plurality of volumes within backup image 110. In this example, while mapping the plurality of volumes within backup image 110, identification module 104 may identify a location of each of the plurality of data blocks within backup image 110.

Figure 5:
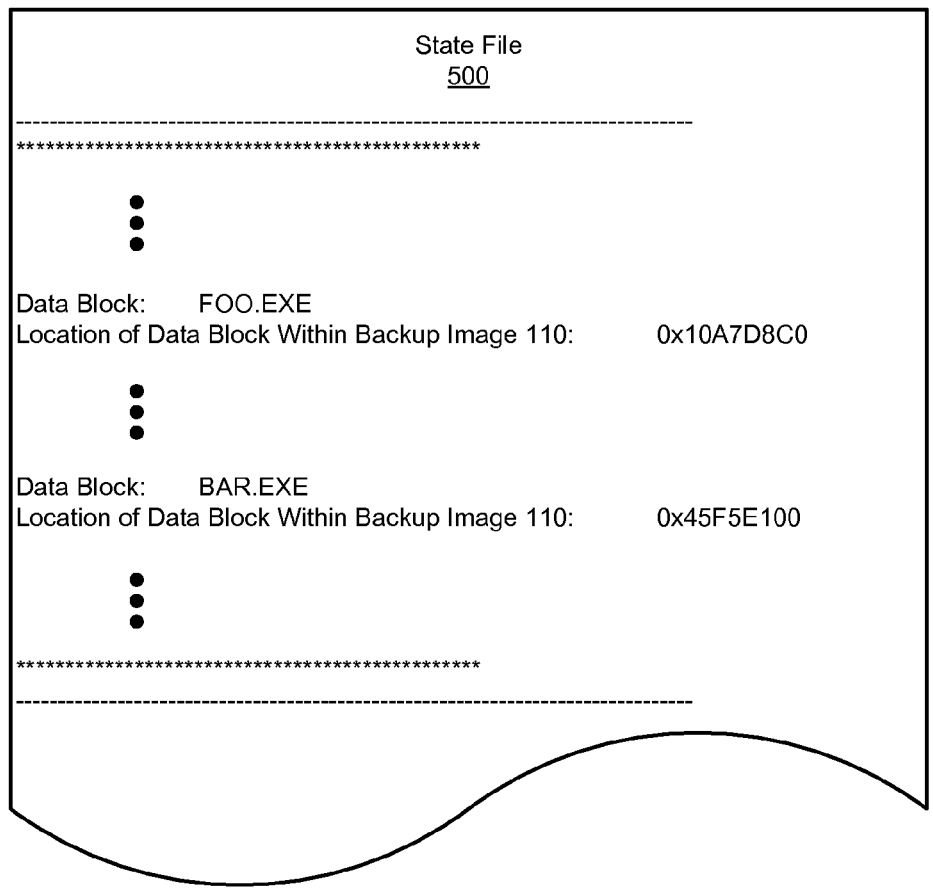
FIG. 5 is an illustration of an exemplary state file and an exemplary list of changed data blocks.
Figure 5:
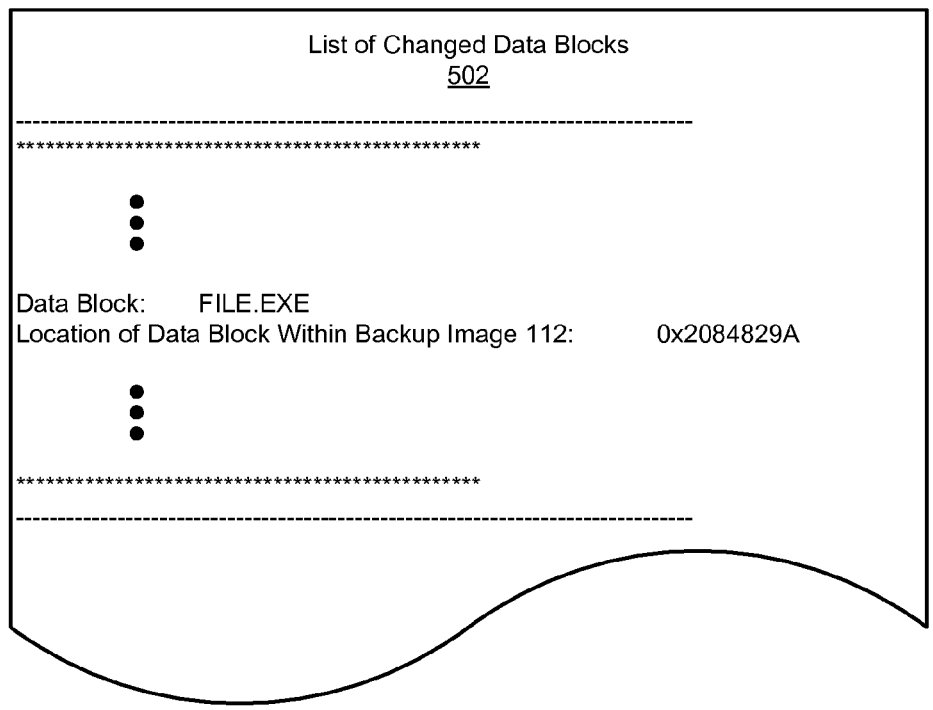

After identification module 104 has identified the location of each of the plurality of data blocks within backup image 110, creation module 108 may, as part of computing device 202 in FIG. 2, create a state file 500 that identifies where the plurality of data blocks are located within backup image 110. As illustrated in FIG. 5, state file 500 may include information that identifies a plurality of data blocks captured in backup image 110 (in this example, "FOO.EXE," "BAR.EXE," and so on) as well as the respective locations of the plurality of data blocks within backup image 110 (in this example, "0x10A7D8C0," "0x45F5E100," and so on).

In some examples, identification module 104 may identify backup image 110 of virtual machine 114 after backup image 110 is captured. For example, capture module 118 may, as part of computing device 302 in FIG. 3, capture backup image 110 of virtual machine 114 on computing device 302 at the specific point in time. After capture module 118 has captured backup image 110 of virtual machine 114, transfer module 106 may, as part of computing device 302 in FIG. 3, direct computing device 302 to transfer backup image 110 to backup host 308 via network 304.

Continuing with this example, backup host 308 may receive backup image 110 from computing device 302 via network 304. As backup host 308 receives backup image 110, identification module 104 may, as part of backup host 308 in FIG. 3, obtain and identify backup image 110. Upon identifying backup image 110, identification module 104 may identify a plurality of data blocks included in backup image 110. Creation module 108 may then, as part of backup host 308 in FIG. 3, create state file 500 that identifies where the plurality of data blocks are located within backup image 110.

As illustrated in FIG. 4, at step 404 one or more of the systems described herein may transfer the backup image of the virtual machine to a server that stores the backup image. For example, at step 404 transfer module 106 may, as part of computing device 202 in FIG. 2 or backup host 308 in FIG. 3, transfer backup image 110 of virtual machine 114 to a media server for storage and/or maintenance. In this example, by transferring backup image 110 of virtual machine 114 to the media server, transfer module 106 may provide the media server with a baseline for synthesizing a true accelerated backup image of virtual machine 114.

The systems described herein may perform step 404 in a variety of ways. In some examples, transfer module 106 may direct computing device 202 to transfer backup image 110 of virtual machine 114 to media server 206 via network 204. In such examples, media server 206 may receive backup image 110 from computing device 202 via network 204. Upon receiving backup image 110 from computing device 202, media server 206 may store and/or maintain backup image 110 to facilitate synthesizing a true accelerated backup image of virtual machine 114.

In some examples, transfer module 106 may direct backup host 308 to transfer backup image 110 of virtual machine 114 to media server 306 via network 304. In such examples, media server 306 may receive backup image 110 from backup host 308 via network 304. Upon receiving backup image 110 from backup host 308, media server 306 may store and/or maintain backup image 110 to facilitate synthesizing a true accelerated backup image of virtual machine 114.

As illustrated in FIG. 4, at step 406 one or more of the systems described herein may identify a subsequent backup image that represents at least a portion of the virtual machine at a subsequent point in time. For example, at step 406 identification module 104 may, as part of computing device 202 in FIG. 2 or backup host 308 in FIG. 3, identify backup image 112 that represents at least a portion of virtual machine 114 at a subsequent point in time. In one example, backup image 112 may include a full backup image of virtual machine 114. In another example, backup image 112 may include an incremental backup image of virtual machine 114 used to synthesize a true accelerated backup image of virtual machine 114.

The systems described herein may perform step 406 in a variety of ways. In some examples, identification module 104 may identify backup image 112 of virtual machine 114 as backup image 112 is captured. For example, capture module 118 may, as part of computing device 202 in FIG. 2, capture backup image 112 of virtual machine 114 on computing device 202 at the subsequent point in time. In this example, as capture module 118 captures backup image 112 of virtual machine 114, identification module 104 may identify backup image 112.

Upon identifying backup image 112, identification module 104 may identify a plurality of data blocks included in backup image 112. For example, identification module 104 may map a plurality of volumes within backup image 112. In this example, while mapping the plurality of volumes within backup image 112, identification module 104 may identify a location of each of the plurality of data blocks within backup image 112.

After identification module 104 has identified the location of each of the plurality of data blocks within backup image 112, creation module 108 may, as part of computing device 202 in FIG. 2, create a subsequent state file (not illustrated in FIG. 5) that identifies where the plurality of data blocks are located within backup image 112. In one example, creation module 108 may retrieve state file 500 to use as a baseline for creating the subsequent state file that identifies where the plurality of data blocks are located within backup image 112 (by, e.g., modifying state file 500). In another example, creation module 108 may create the subsequent state file that identifies where the plurality of data blocks are located within backup image 112 without using any previous state file as a baseline.

In some examples, identification module 104 may identify backup image 112 of virtual machine 114 after backup image 110 is captured. For example, capture module 118 may, as part of computing device 302 in FIG. 3, capture backup image 112 of virtual machine 114 on computing device 302 at the subsequent point in time. After capture module 118 has captured backup image 112 of virtual machine 114, transfer module 106 may, as part of computing device 302 in FIG. 3, direct computing device 302 to transfer backup image 112 to backup host 308 via network 304.

Continuing with this example, backup host 308 may receive backup image 112 from computing device 302 via network 304. As backup host 308 receives backup image 112, identification module 104 may, as part of backup host 308 in FIG. 3, obtain and identify backup image 112. Upon identifying backup image 112, identification module 104 may identify a plurality of data blocks included in backup image 112. Creation module 108 may then, as part of backup host 308 in FIG. 3, create a subsequent state file that identifies where the plurality of data blocks are located within backup image 112.

As illustrated in FIG. 4, at step 408 one or more of the systems described herein may identify at least one data block captured in the subsequent backup image that changed within the virtual machine between the specific point in time and the subsequent point in time. For example, at step 408 identification module 104 may, as part of computing device 202 in FIG. 2 or backup host 308 in FIG. 3, identify at least one data block captured in backup image 112 that changed within virtual machine 114 between the specific point in time and the subsequent point in time. In one example, the changed data block may include a new file that did not exist within virtual machine 114 at the specific point in time but did exist within virtual machine 114 at the subsequent point in time. In another example, the changed data block may include at least a portion of a file that was modified or deleted within virtual machine 114 between the specific point in time and the subsequent point in time.

The systems described herein may perform step 408 in a variety of ways. In some examples, identification module 104 may obtain a list of changed data blocks from virtualization software that facilitates execution of the virtual machine 114. For example, computing device 202 may include a VMWARE virtualization environment that facilitates execution of virtual machine 114. In this example, the VMWARE virtualization environment may have a Changed Block Tracking (CBT) feature that tracks any changes to data blocks within virtual machine 114. The VMWARE virtualization environment may use the CBT feature to create a list 502 of data blocks that have changed within virtual machine 114 between the specific point in time and the subsequent point in time.

As illustrated in FIG. 5, list 502 may include information that identifies a plurality of data blocks that changed within virtual machine 114 between the specific point in time and the subsequent point in time (in this example, "FILE.EXE," and so on) as well as the respective locations of the plurality of changed data blocks within backup image 112 (in this example, "0x2084829A," and so on).

Identification module 104 may request list 502 from the VMWARE virtualization environment upon identifying backup image 112. In response to this request, the VMWARE virtualization environment may provide list 502 to identification module 104. Identification module 104 may obtain list 502 from the VMWARE virtualization environment.

Upon obtaining list 502 from the VMWARE virtualization environment, identification module 104 may analyze list 502 to identify any data blocks that changed within virtual machine 114 between the specific point in time and the subsequent point in time. For example, identification module 104 may analyze list 502 and determine that data block "FILE.EXE" changed within virtual machine 114 between the specific point in time and the subsequent point in time based at least in part on the analysis. In this example, identification module 104 may then determine that changed data block "FILE.EXE" is located at address "0x2084829A" based at least in part on list 502.

As illustrated in FIG. 4, at step 410 one or more of the systems described herein may identify at least one data block that remained unchanged within the virtual machine between the specific point in time and the subsequent point in time. For example, at step 410 identification module 104 may, as part of computing device 202 in FIG. 2 or backup host 308 in FIG. 3, identify at least one data block that remained unchanged within virtual machine 114 between the specific point in time and the subsequent point in time. In this example, the unchanged data block may include at least a portion of a file that was neither modified nor deleted within virtual machine 114 between the specific point in time and the subsequent point in time.

The systems described herein may perform step 410 in a variety of ways. In some examples, identification module 104 may deduce the unchanged block's identity based at least in part on state file 500 and/or list 502. In one example, identification module 104 may compare state file 500 and list 502. For example, identification module 104 may identify data block "FOO.EXE" located at address "0x10A7D8C0" and data block "BAR.EXE" located at address "0x45F5E100" in state file 500. In this example, identification module 104 may search list 502 for data blocks "FOO.EXE" and "BAR.EXE" and fail to find these data blocks during the search of list 502. Identification module 104 may then determine that data blocks "FOO.EXE" and "BAR.EXE" remained unchanged within virtual machine 114 between the specific point in time and the subsequent point in time since these data blocks were not found in list 502.

In some examples, upon deducing the unchanged block's identity, identification module 104 may determine where the unchanged data block is located within the backup image based at least in part on state file 500. For example, identification module 104 may search state file 500 for the respective locations of data blocks "FOO.EXE" and "BAR.EXE" within backup image 110 stored on media server 206. In this example, while searching state file 500, identification module 104 may identify address "0x10A7D8C0" as the location of data block "FOO.EXE" and address "0x45F5E100" as the location of data block "BAR.EXE" within backup image 110.

As illustrated in FIG. 4, at step 412 one or more of the systems described herein may create a data stream that includes the changed data block and at least one reference that identifies where the unchanged data block is located within the backup image stored on the server. For example, at step 412 creation module 108 may, as part of computing device 202 in FIG. 2 or backup host 308 in FIG. 3, create data stream 116 that includes the changed data block and at least one reference that identifies where the unchanged data block is located within backup image 110 stored on the media server. Examples of data stream 116 include, without limitation, bitstreams, bytestreams, TAR streams, TAR headers, codata, combinations of one or more of the same, or any other suitable data streams.

The term "reference," as used herein, generally refers to any type or form of identifier that identifies or otherwise indicates a location of a specific data block within a backup image. Examples of such a reference include, without limitation, addresses, pointers, hashes, combinations of one or more of the same, or any other type of suitable reference.

Figure 6:
FIG. 6 is an illustration of an exemplary data stream that facilitates synthesizing and optimizing a backup image on a media server.

The systems described herein may perform step 412 in a variety of ways. In some examples, creation module 108 may format data stream 116 in a file format that gives data stream 116 the appearance of a full backup image. As illustrated in FIG. 6, data stream 116 may include a sequence of data that resembles a full backup image of virtual machine 114 and includes the changed data blocks (in this example, data block "FILE.EXE" located at address "0x2084829A," and so on) and the references that identify where the unchanged data blocks are located within backup image 110 stored on the media server (in this example, "REFERENCE TO DATA BLOCK LOCATED AT 0x10A7D8C0 WITHIN BACKUP IMAGE," "REFERENCE TO DATA BLOCK LOCATED AT 0x45F5E100 WITHIN BACKUP IMAGE," and so on).

In one example, creation module 108 may create data stream 116 by building upon backup image 112 of virtual machine 114. For example, creation module 108 may create references that identify data blocks "FOO.EXE" and "BAR.EXE" and then add the same to backup image 112. In this example, creation module 108 may arrange the references in the proper order with respect to data block "FILE.EXE" within backup image 112 such that the references act as placeholders for data blocks "FOO.EXE" and "BAR.EXE" within data stream 116. By arranging the references in the proper order with respect to data block "FILE.EXE" within backup image 112, creation module 108 may essentially convert backup image 112 into data stream 116.

In another example, creation module 108 may create data stream 116 by retrieving the changed data block from backup image 112 of virtual machine 114. For example, creation module 108 may use the references that identify data blocks "FOO.EXE" and "BAR.EXE" as the baseline for creating data stream 116. In this example, creation module 108 may retrieve data block "FILE.EXE" from backup image 112 and then add the same to data stream 116. Creation module 108 may arrange the references in the proper order with respect to data block "FILE.EXE" within data stream 116 such that the references act as placeholders for data blocks "FOO.EXE" and "BAR.EXE."

By arranging the references in the proper order with respect to the changed data blocks, creation module 108 may essentially index data stream 116 as though data stream 116 were a full backup image. Since, in this example, creation module 108 has indexed data stream 116 as though data stream 116 were a full backup image, the media server may use data stream 116 to synthesize a true accelerated backup image that represents virtual machine 114 at the subsequent point in time without mounting any virtual disks of the true accelerated synthetic backup image.

In other words, since, in this example, creation module 108 has indexed data stream 116 at computing device 202 in FIG. 2 or backup host 308 in FIG. 3, the media server may no longer need to index the synthetic backup image. Moreover, since the media server no longer needs to index the synthetic backup image, the media server may no longer need to mount any of the virtual disks of the synthetic backup image to perform any post-processing and/or indexing operations on the synthetic backup image.

As a result, the media server may be able to provide synthesizing and backup services to a variety of different physical and/or virtual computing platforms. In other words, since the media server no longer needs to perform any post-processing and/or indexing operations on the synthetic backup image, the synthesizing and backup services provided by the media server may be platform-independent.

In some examples, creation module 108 may exclude each data block that was deleted from virtual machine 114 between the specific point in time and the subsequent point in time from data stream 116. In one example, identification module 104 may identify each data block that was deleted from virtual machine 114 between the specific point in time and the subsequent point in time. For example, identification module 104 may determine that at least one data block was deleted from virtual machine 114 between the specific point in time and the subsequent point in time by analyzing backup image 112, state file 500, and/or list 502. In this example, since identification module 104 has determined that the data block was deleted from virtual machine 114, creation module 108 may exclude the data block (as well as any reference to the location of the data block within backup image 110) from data stream 116 to enable the media server to optimize the synthetic backup image.

As illustrated in FIG. 4, at step 414 one or more of the systems described herein may transfer the data stream to the server to enable the server to create and optimize a synthetic backup image that represents the virtual machine at the subsequent point in time. For example, at step 414 transfer module 106 may, as part of computing device 202 in FIG. 2 or backup host 308 in FIG. 3, transfer data stream 116 to the media server. By transferring data stream 116 to the media server, transfer module 106 may enable the media server to create and optimize synthetic backup image 120 that represents virtual machine 114 at the subsequent point in time.

The systems described herein may perform step 414 in a variety of ways. In some examples, transfer module 106 may direct computing device 202 to transfer data stream 116 to media server 206 via network 204. In such examples, media server 206 may receive data stream 116 from computing device 202 via network 204. Upon receiving data stream 116 from computing device 202, media server 306 may begin to create synthetic backup image 120 based at least on in part on data stream 116 and backup image 110.

In other examples, transfer module 106 may direct backup host 308 to transfer data stream 116 of virtual machine 114 to media server 306 via network 304. In such examples, media server 306 may receive backup image 110 from backup host 308 via network 304. Upon receiving backup image 110 from backup host 308, media server 306 may begin to synthesize backup image 120 based at least on in part on data stream 116 and backup image 110.

In one example, the media server may create synthetic backup image 120 by replacing the references included in data stream 116 with the data blocks identified by the references. For example, creation module 108 may, as part of media server 206 in FIG. 2 or media server 306 in FIG. 3, search data stream 116 and then find the references to addresses "0x10A7D8C0" and "0x45F5E100" within backup image 110 during this search of data stream 116. Upon finding these references, creation module 108 may access addresses "0x10A7D8C0" and "0x45F5E100" within backup image 110 and then retrieve data blocks "FOO.EXE" and "BAR.EXE" at the addresses. Creation module 108 may then replace the references to addresses "0x10A7D8C0" and "0x45F5E100" within backup image 110 with data blocks "FOO.EXE" and "BAR.EXE."

By creating synthetic backup image 120 in this manner at media server 206 in FIG. 2 or media server 306 in FIG. 3, creation module 108 may optimize synthetic backup image 120. For example, since data stream 116 excludes each deleted data block (as well as any reference to a deleted data block's location within backup image 110), creation module 108 may have no reason to add any deleted data blocks to synthetic backup image 120. As a result, creation module 108 may optimize synthetic backup image 120 by excluding each data block that was deleted from virtual machine 114 between the specific point in time and the subsequent point in time. The term "optimize," as used herein, generally refers to the act of including only those data blocks used by a virtual machine at a specific point in time in a synthesized backup image that represents the virtual machine at the specific point in time.

After creation module 108 has optimized synthetic backup image 120, the media server may store and/or maintain optimized synthetic backup 120 to enable the media server to facilitate restoring virtual machine 114 to the computing state experienced by virtual machine 114 at the subsequent point in time. For example, the media server may enable computing device 202 in FIG. 2 or computing device 302 in FIG. 3 to return virtual machine 114 to the computing state experienced by virtual machine 114 at the subsequent point in time by applying synthetic backup image 120. In this example, the computing state experienced by virtual machine 114 does not include any of the data blocks that were deleted from virtual machine 114 between the specific point in time and the subsequent point in time.

As explained above in connection with method 400 in FIG. 4, a backup and restore agent installed on a host computing device may capture a full backup of a virtual machine configured to run on the host computing device. Upon capturing the full backup of the virtual machine, the backup and restore agent may map the volumes within the full backup to identify the location of each data block within the full backup. The backup and restore agent may then create a state file that identifies the location of each data block within the full backup based at least in part on this mapping.

Upon creating the state file, the backup and restore agent may direct the host computing device to upload the full backup to the media server via a network. The media server may store and/or maintain the full backup to facilitate synthesizing a backup of the virtual machine at a later point in time.

The backup and restore agent installed on the host computing device may later capture a subsequent backup of the virtual machine configured to run on the host computing device. Upon capturing the subsequent backup of the virtual machine, the backup and restore agent may check whether a previous backup of the virtual machine was mapped and uploaded to the media server. During this check, the backup and restore agent may find the state file and then retrieve the same.

In addition, the backup and restore agent may obtain a list of changed data blocks from virtualization software installed that facilitates execution of the virtual machine on the host computing device. Upon obtaining the list of changed data blocks, the backup and restore agent may identify each changed data block by analyzing the list. The backup and restore agent may then identify the location of each changed data block within the full backup by analyzing the state file.

Upon identifying the location of each changed data block, the backup and restore agent may create a data stream that includes (1) each changed data block as captured in the subsequent backup and (2) one or more references that identify the location of each unchanged data block within the full backup stored on the media server. The backup and restore agent may arrange each reference in the proper order with respect to each changed data block within the data stream such that the references act as placeholders for the unchanged data blocks included in the full backup stored on the media server. By arranging each reference in the proper order with respect to each changed data block within the data stream, the backup and restore agent may essentially index the data stream like a full backup—except that the data stream includes references to the unchanged data blocks rather than including the unchanged data blocks themselves.

Upon arranging each reference in the proper order with respect to each changed data block within the data stream, the backup and restore agent may direct the host computing device to upload the full backup to the media server via the network. The media server may create a true accelerated synthetic full backup that represents the virtual machine at the later point in time based at least in part on the data stream and the previous full backup. The media server may then optimize the true accelerated synthetic full backup to exclude each data block deleted from the virtual machine after the capture of the previous full backup.

Since the backup and restore agent has indexed the data stream like a full backup, the media server may not need to index the true accelerated synthetic full backup. Moreover, since the media server does not need to index the true accelerated synthetic full backup, the media server may not need to mount any of the virtual disks of the true accelerated synthetic full backup to perform any post-processing and/or indexing operations on the true accelerated synthetic backup.

As a result, the media server may be able to provide synthesizing and backup services to a variety of different physical and/or virtual computing platforms. In other words, since the media server does not need to perform any post-processing and/or indexing operations on the true accelerated full synthetic backup, the synthesizing and backup services provided by the media server may be platform-independent.

Figure 7:
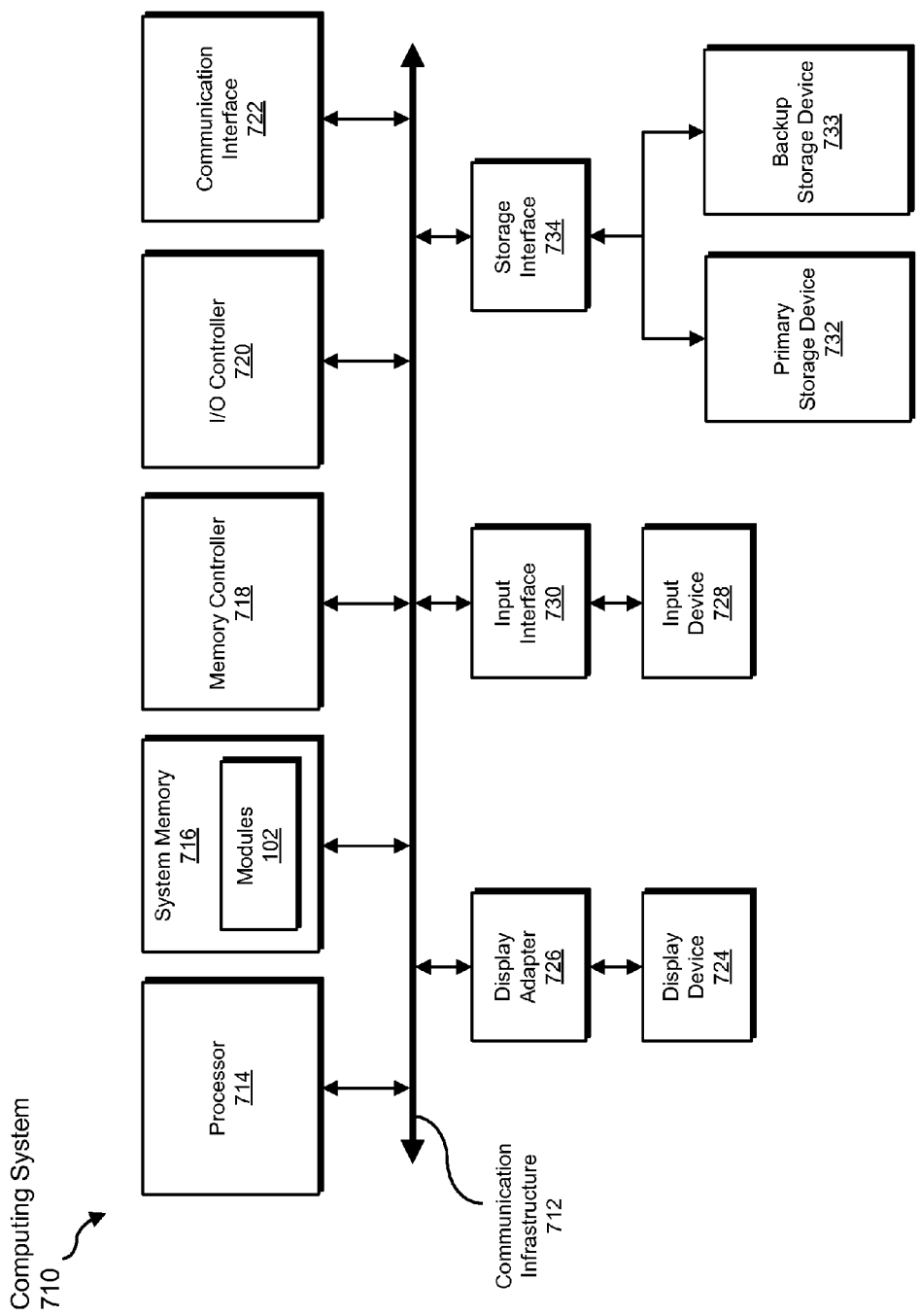
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 4). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
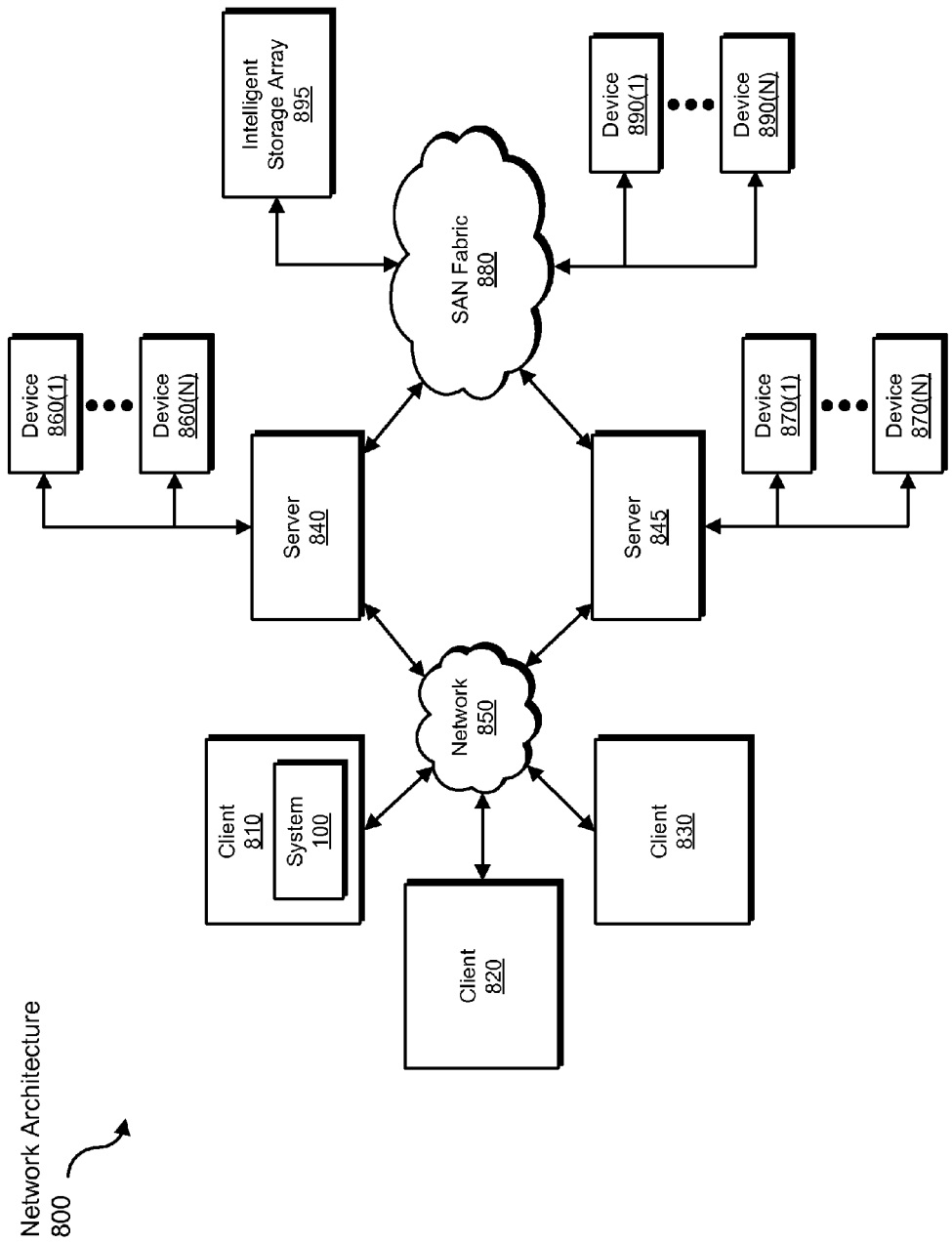
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 4). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for creating optimized synthetic backup images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a backup image to be transformed, transform the backup image, output a result of the transformation to create a data stream, use the result of the transformation to create a synthetic backup image based at least in part on the data stream, and store the result of the transformation to facilitate restoring a virtual machine from synthetic backup image. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating optimized synthetic backup images, at least a portion of the method being performed by a computing device comprising at least one processor, the method comprising:
   identifying, at the computing device, a plurality of data blocks included in a backup image that represents a virtual machine at a specific point in time;
   creating, at the computing device, a state file that identifies where the plurality of data blocks are located within the backup image of the virtual machine at the specific point in time;
   transferring the backup image from the computing device to a server that stores the backup image via a network that facilitates communication between the computing device and the server;
   identifying, at the computing device, a subsequent backup image that represents at least a portion of the virtual machine at a subsequent point in time;
   creating, at the computing device, a data stream that comprises:
      at least one changed data block captured in the subsequent backup image that changed within the virtual machine between the specific point in time and the subsequent point in time;
      at least one reference that identifies where at least one unchanged data block that remained unchanged within the virtual machine between the specific point in time and the subsequent point in time is located within the backup image stored on the server;
   determining, by the computing device, where the at least one unchanged data block is located within the backup image based at least in part on the state file;
   indexing, by the computing device, the data stream as though the data stream were a full backup by arranging the at least one reference in a specific order with respect to the at least one changed data block such that the at least one reference acts as a placeholder for the at least one unchanged data block included in the backup image stored on the server;
   upon creating the data stream, transferring the data stream from the computing device to the server via the network to enable the server to:
      create an optimized synthetic full backup image that:
         represents the virtual machine at the subsequent point in time based at least in part on the at least one changed data block included in the data stream and the at least one unchanged data block whose location within the backup image is identified by the at least one reference;

excludes at least one data block captured in the backup image that was deleted from the virtual machine between the specific point in time and the subsequent point in time;

wherein:

indexing the data stream as though the data stream were a full backup comprises excluding, from the data stream, any reference to the at least one data block that was deleted from the virtual machine between the specific point in time and the subsequent point in time;

creating the optimized synthetic full backup image comprises replacing, at the server, the at least one reference included in the data stream with the at least one unchanged data block from the backup image.

2. The method of claim 1, wherein determining where the at least one unchanged data block is located within the backup image comprises:

searching the state file for the location of the at least one unchanged data block within the backup image of the virtual machine;

while searching the state file, identifying the location of the at least one unchanged data block within the backup image of the virtual machine.

3. The method of claim 1, wherein creating the state file that identifies where the plurality of data blocks are located within the backup image comprises:

mapping a plurality of volumes within the backup image of the virtual machine;

while mapping the plurality of volumes, identifying a location of each of the plurality of data blocks within the backup image of the virtual machine.

4. The method of claim 1, wherein:

the backup image that represents the virtual machine at the specific point in time comprises a full backup of the virtual machine;

the subsequent backup image that represents the virtual machine at the subsequent point in time comprises an incremental backup of the virtual machine.

5. The method of claim 1, wherein the at least one reference included in the data stream comprises a placeholder for the at least one unchanged data block located within the backup image.

6. The method of claim 1, wherein creating the data stream comprises:

obtaining a list of changed data blocks from virtualization software that facilitates execution of the virtual machine;

determining that the at least one changed data block has changed within the virtual machine based at least in part on the list of changed data blocks obtained from the virtualization software.

7. The method of claim 1, wherein optimizing the synthetic backup image comprises storing the optimized synthetic full backup image to facilitate restoring the virtual machine to a computing state experienced by the virtual machine at the subsequent point in time.

8. The method of claim 7, wherein restoring the virtual machine to the computing state experienced by the virtual machine at the subsequent point in time comprises restoring the virtual machine without the at least one data block deleted from the virtual machine between the specific point in time and the subsequent point in time.

9. The method of claim 1, further comprising capturing the backup image of the virtual machine on a host computing system at the specific point in time.

10. The method of claim 1, further comprising obtaining the backup image from a host computing system that hosts the virtual machine.

11. The method of claim 1, further comprising capturing the subsequent backup image of the virtual machine on a host computing system at the subsequent point in time.

12. The method of claim 1, further comprising obtaining the subsequent backup image of the virtual machine from a host computing system that hosts the virtual machine.

13. The method of claim 1, wherein indexing the data stream as though the data stream were a full backup comprises enabling the server to create the optimized synthetic full backup image by replacing the at least one reference included in the data stream with the at least one unchanged data block identified by the at least one reference.

14. The method of claim 1, wherein indexing the data stream as though the data stream were a full backup comprises enabling the server to create the optimized synthetic full backup image without mounting any virtual disks of the synthetic full backup.

15. A system for creating optimized synthetic backup images, the system comprising:

an identification module, stored in memory, that identifies, at a computing device, a plurality of data blocks included in a backup image that represents a virtual machine at a specific point in time;

a creation module, stored in memory, that creates, at the computing device, a state file that identifies where the plurality of data blocks are located within the backup image of the virtual machine at the specific point in time;

a transfer module, stored in memory, that transfers the backup image from the computing device to a server that stores the backup image via a network that facilitates communication between the computing device and the server;

wherein the identification module further identifies, at the computing device, a subsequent backup image that represents at least a portion of the virtual machine at a subsequent point in time;

wherein the creation module further creates, at the computing device, a data stream comprising:

at least one changed data block captured in the subsequent backup image that changed within the virtual machine between the specific point in time and the subsequent point in time;

at least one reference that identifies where at least one unchanged data block that remained unchanged within the virtual machine between the specific point in time and the subsequent point in time is located within the backup image stored on the server;

wherein the identification module further determines, at the computing device, where the at least one unchanged data block is located within the backup image based at least in part on the state file;

wherein the creation module further indexes, at the computing device, the data stream as though the data stream were a full backup by arranging the at least one reference in a specific order with respect to the at least one changed data block such that the at least one reference acts as a placeholder for the at least one unchanged data block included in the backup image stored on the server;

wherein the transfer module further transfers the data stream from the computing device to the server via the network to enable the server to:

create an optimized synthetic full backup image that:
    represents the virtual machine at the subsequent point in time based at least in part on the at least one changed data block included in the data stream and the at least one unchanged data block whose location within the backup image is identified by the at least one reference;
    excludes at least one data block captured in the backup image that was deleted from the virtual machine between the specific point in time and the subsequent point in time;
wherein:
    indexing the data stream as though the data stream were a full backup comprises excluding, from the data stream, any reference to the at least one data block that was deleted from the virtual machine between the specific point in time and the subsequent point in time;
    creating the optimized synthetic full backup image comprises replacing, at the server, the at least one reference included in the data stream with the at least one unchanged data block from the backup image;
at least one physical processor that executes the transfer module, the identification module, and the creation module.

16. The system of claim 15, wherein the identification module further:
    searches the file for the location of the at least one unchanged data block within the backup image of the virtual machine;
    identifies the location of the at least one unchanged data block within the backup image of the virtual machine while searching the file.

17. A non-transitory computer-readable-storage medium comprising one or more computer-executable instructions that, when executed by at least one processor of a computing device, cause the computing device to:
    identify, at the computing device, a plurality of data blocks included in a backup image that represents a virtual machine at a specific point in time;
    create, at the computing device, a state file that identifies where the plurality of data blocks are located within the backup image of the virtual machine at the specific point in time;
    transfer the backup image from the computing device to a server that stores the backup image via a network that facilitates communication between the computing device and the server;
    identify, at the computing device, a subsequent backup image that represents at least a portion of the virtual machine at a subsequent point in time;
    create, at the computing device, a data stream that comprises:
        at least one changed data block captured in the subsequent backup image that changed within the virtual machine between the specific point in time and the subsequent point in time;
        at least one reference that identifies where at least one unchanged data block that remained unchanged within the virtual machine between the specific point in time and the subsequent point in time is located within the backup image stored on the server;
    determine, by the computing device, where the at least one unchanged data block is located within the backup image based at least in part on the state file;
    index, at the computing device, the data stream as though the data stream were a full backup by arranging the at least one reference in a specific order with respect to the at least one changed data block such that the at least one reference acts as a placeholder for the at least one unchanged data block included in the backup image stored on the server;
    upon creating the data stream, transfer the data stream from the computing device to the server via the network to enable the server to:
        create an optimized synthetic full backup image that:
            represents the virtual machine at the subsequent point in time based at least in part on the at least one changed data block included in the data stream and the at least one unchanged data block whose location within the backup image is identified by the at least one reference;
            excludes at least one data block captured in the backup image that was deleted from the virtual machine between the specific point in time and the subsequent point in time;
        wherein:
            indexing the data stream as though the data stream were a full backup comprises excluding, from the data stream, any reference to the at least one data block that was deleted from the virtual machine between the specific point in time and the subsequent point in time;
            creating the optimized synthetic full backup image comprises replacing, at the server, the at least one reference included in the data stream with the at least one unchanged data block from the backup image.

* * * * *